Feb. 24, 1953  N. E. WAHLBERG ET AL  2,629,454
OVERDRIVE KICKDOWN CONTROL MEANS
Filed Oct. 21, 1946
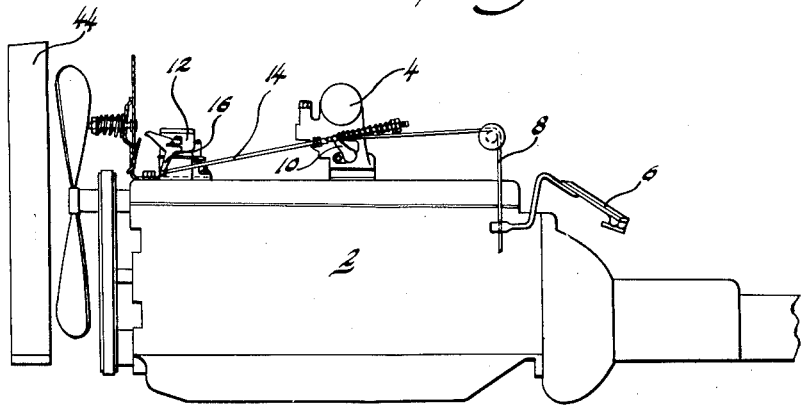
Fig. 1
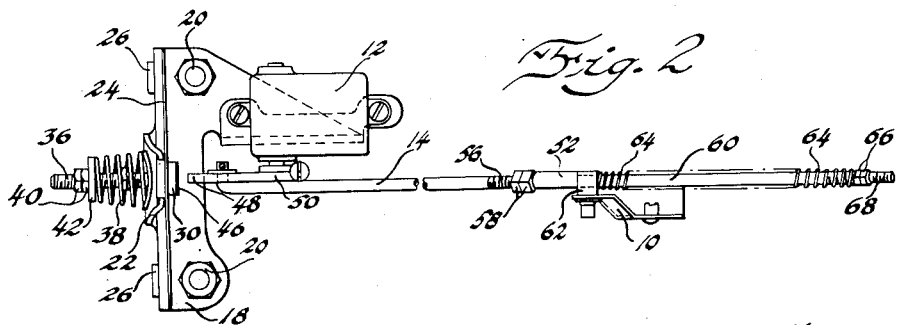
Fig. 2
Fig. 4
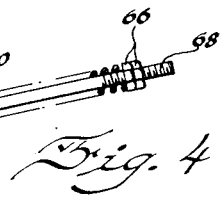
Fig. 3
NILS ERIK WAHLBERG
JOSEPH F. SLADKY
INVENTOR.
BY Carl J. Barbee
THEIR ATTORNEY Patented Feb. 24, 1953

2,629,454

UNITED STATES PATENT OFFICE 2,629,454

OVERDRIVE KICKDOWN CONTROL MEANS

Nils Erik Wahlberg, Chicago, Ill., and Joseph F. Sladky, Plymouth, Mich., assignors to Nash-Kelvinator Corporation, Kenosha, Wis., a corporation of Maryland Application October 21, 1946, Serial No. 704,718

6 Claims. (Cl. 180—82.1)

This invention relates to control means and more particularly relates to control means for switches used in vehicles.

It is an object of this invention to provide an adjustable control means for a switch associated with a motor vehicle which controls the operation of the switch relative to the speed of the forward movement of the vehicle.

It is a further object of this invention to provide a wind control means for a switch of the motor vehicle which is easy to assemble and simple to adjust.

It is another object of this invention to provide a wind controlled means for controlling the operation of a switch of a motor vehicle which is simple and economical to manufacture.

Other objects and advantages of the invention will appear from a consideration of the following description, claims and accompanying drawings wherein like reference characters are used to indicate like parts and which consists of one sheet, in which:

Figure 1 is a side elevational view of the power unit of a motor vehicle showing the invention, partially in section, as associated therewith;

Figure 2 is a plan view of the invention as shown in Figure 1;

Figure 3 is an enlarged side elevational view of a portion of the invention as shown in Figure 1; and Figure 4 is an enlarged view of a portion of the arrangement shown in Figure 1.

Illustrated in Figure 1 is an ordinary automobile engine 2 with the usual carburetor 4 associated therewith and a manually controlled accelerator pedal 6 connected to carburetor 4 by cable 8 for rotating the throttle lever 10 of carburetor 4 in a clockwise direction when pedal 6 is depressed. When lever 10 is rotated by depressing pedal 6, the throttle valve (not shown) of carburetor 4 is opened to accelerate the engine 2.

It is a common practice in the development of semi-automatic and automatic driving mechanisms for automobiles to provide means for shifting the speed gear mechanism thereof to a lower gear by merely depressing the accelerator pedal. This provision generally is made to provide means by which the operator of the vehicle may quickly and automatically return the speed gears to a lower ratio to afford more pickup which may be necessary in passing cars, etc. One means commonly used in providing a mechanism for returning the speed gears to a lower ratio is a kick-down switch 12 which is operated by the accelerator pedal 6 to momentarily interrupt the ignition circuit when pedal 6 is depressed to its extreme limit. A connection between the accelerator pedal and switch 12 is provided in the form of a rod 14 which is secured to lever 10 and crank arm 16 of switch 12. When pedal 6 is depressed rotating lever 10 in a clockwise direction, rod 14 will be pulled to rotate crank arm 16 in a counter-clockwise direction to open kick-down switch 12.

It is not desirable to attempt to reduce the speed gear ratio when the vehicle is traveling at high rates of speed because there is the inherent danger of damaging or destroying the gears. Therefore, applicants have invented a means for preventing the opening of kick-down switch 12 when the vehicle is traveling above a pre-determined speed.

The means for preventing switch 12 from being opened when the vehicle is traveling at excessive speeds is comprised of a carrying bracket having a horizontal portion 18 (Figures 2 and 3) rigidly secured to the top of motor 2 by nuts 20 and a substantially vertical portion 22 extending upward from said portion 18. A flat wind plate 24 is associated with vertical portion 22 of the carrying bracket by having a plurality of S-shaped extensions 26 extending below its lower edge and forwardly through apertures 28 which extend through portion 22. Portions 26 are loosely positioned within apertures 28 to permit rotation of plate 24 rearwardly from portion 22 substantially about the center of apertures 28. Plate 24 is provided with a cut out portion 30 which is bent rearwardly from plate 24 so that it lies in a plane at an angle thereto. A rod 32 is rigidly secured within an aperture in plate 24 and extends horizontally and forwardly therefrom through an aperture 34 extending through portion 22 of the bracket to its threaded end 36 around which was telescopically positioned a compression spring 38 which is held in abutment with portion 22 of the bracket by nuts 40 which are turned on the threaded end 36 of rod 32 to hold washer 42 which is telescopically positioned on rod 32 against the forward end of spring 38. Wind plate 24 is carried by portion 22 on the top of the forward end of the engine 2 where plate 24 will be exposed to air currents passing through the radiator 44 of the vehicle from the outside thereof. The velocity of said air currents is largely determined by the speed at which the vehicle is traveling and movement of plate 24 rearwardly from portion 22 by the air currents will be controlled by the weight of spring 38 and the amount said spring is compressed by turning the nuts 40 on the rod 32. By so doing, this mechanism may be set so that plate 24 will rotate rearwardly at any predetermined speed.

When plate 24 is rotated rearwardly, the upper end 46 of portion 30 will be moved below the outer end 48 of arm 50 which is formed as a part of crank arm 16 and extends forwardly and slightly upwardly therefrom. In this manner, when the vehicle is operating at a speed at which the air currents will rotate plate 24 rearwardly so that the end 46 of portion 30 is below arm 50, rotation of arm 50 by rotating the crank arm 16 will cause the end 48 of arm 50 to strike the end 46 of portion 30 thus preventing further rotation of crank arm 16 toward the position where switch 12 will be opened. Thus, the applicants have provided a means for preventing the opening of kick-down switch 12 when the vehicle is moving at speeds above a predetermined speed.

So that prevention of rotation of crank arm 16 by portion 30 of plate 24 does not prevent further rotation of throttle lever 10 of carburetor 4 to further accelerate the engine 2, the applicants have provided a resilient connection between lever 10 and rod 14. Rod 52 having a blind threaded hole 54 tapped in the forward end thereof is turned on the rearward threaded end 56 of rod 14 and is rigidly secured in position thereon by a pair of nuts 58 telescopically positioned on portion 56 in abutment with the forward end of rod 52. Rod 52 is provided with a rearwardly extending reduced portion 60 which extends through an aperture in shaft 62 which is rotatably secured in a horizontal position in an aperture in the outer end of lever 10. A compression spring 64 is telescopically positioned on portion 60 of rod 52 between shaft 62 and a pair of nuts 66 which are turned on the rearward threaded end 68 of rod 52. Thus, if the operator wishes to accelerate the engine beyond the point at which end 48 of arm 50 will strike end 46 of portion 30, he may further depress pedal 6 further rotating lever 10 in a clockwise direction which will move shaft 62 rearwardly along portion 60 of rod 52 compressing spring 64.

In this manner the inventors have provided a control means responsive to air currents which is easy to assemble and adjust, and simple and economical to manufacture.

While the invention is described in much detail above, it is intended that this description is an example only and not limiting on the invention, to which we make the following claims:

1. In a motor vehicle, a switch, a crank arm associated with said switch for controlling same, means for rotating said crank arm, a means for selectively controlling the rotation of said crank arm and positioned so as to be exposed to air currents and comprising a bracket, a wind plate positioned against said bracket and pivotally secured at its one side thereto and exposed to said air currents and designed to be moved thereby to obstruct movement of said crank arm, and resilient means tending to hold said wind plate against said bracket to permit rotation of said crank arm.

2. In a motor vehicle, a switch, a rotatable crank secured to said switch for control thereof, a control means for said crank, a bracket, a wind plate pivotally secured at its one side and exposed to air currents, resilient means for holding said wind plate against said bracket against the force of said air currents, and means formed on said wind plate for preventing rotation of said crank when said wind plate is moved a predetermined distance relative to said bracket.

3. In a motor vehicle, an engine, a switch mounted on said engine, a rotatable crank associated with said switch for controlling operation thereof, a control means to actuate said crank, a substantially vertical bracket secured to said engine, a wind plate pivotally secured at its one edge to said bracket and having another portion thereof exposed to air currents, resilient means designed to hold said wind plate in engagement with said bracket against the force of said air currents, and means formed on said wind plate designed to prevent movement of said crank when said air currents are strong enough to move said plate a predetermined distance relative to said bracket.

4. In a motor vehicle, an engine, a switch mounted on said engine, a rotatable crank carried by said switch for controlling the operation thereof, a control means for actuating said crank, a substantially vertical bracket secured to said engine adjacent said switch, a wind plate pivotally secured at its one edge to said bracket and having a portion thereof exposed to the normal air currents present adjacent the engine of a vehicle, an aperture in said bracket, a threaded pin carried by said wind plate and extending through said bracket, a compression spring telescopically positioned around said pin and having its one end positioned against the side of said bracket remote from said wind plate, means turned on said threaded pin against the other end of said compression spring for selectively compressing same, and means formed on said wind plate designed to be moved into a position which will prevent rotation of said crank when the air currents move the exposed portion of said wind plate relative to said bracket against the weight of said spring.

5. In a motor vehicle, a switch, a switch arm, a manually controlled linkage connected to the switch arm, a bracket, a wind plate mounted on the bracket and movable relative thereto under the influence of moving air, said switch arm being movable by means of the linkage in one direction to open the switch and in another direction to close the switch, a finger formed on the wind plate and engageable with the switch arm when the vehicle exceeds a predetermined rate of speed so as to prevent movement of the switch arm in one of its normal directions of movement and a resilient member normally urging the wind plate toward a retracted position wherein the finger is outside of the path of movement of the switch arm whenever the speed of the vehicle is below a predetermined rate.

6. In a motor vehicle, a switch, an arm associated with the switch and movable in one direction to open the switch and in another direction to close the switch, a manually controlled linkage connected to said arm, a bracket, a wind plate mounted on the bracket, said wind plate being movable relative to the bracket and into the path of movement of the switch arm under the influence of moving air striking said plate, whereby whenever the vehicle speed reaches a predetermined rate said wind plate is moved into the path of movement of the switch arm and into engagement with the switch arm so as to prevent movement of the switch arm in one of its normal directions of movement, and a resilient member normally urging the wind plate into a position out of the path of movement of the switch arm, whenever the speed of the vehicle is below a predetermined rate.

NILS ERIK WAHLBERG.
JOSEPH F. SLADKY.

REFERENCES CITED

The following references are of record in the file of this patent:

UNITED STATES PATENTS

| Number | Name | Date |
|---|---|---|
| 1,634,069 | Cordray | June 28, 1927 |
| 1,730,683 | Philbrick et al. | Oct. 8, 1929 |
| 2,188,704 | Claytor | Jan. 30, 1940 |
| 2,281,916 | Claytor | May 5, 1942 |
| 2,364,774 | Boyce et al. | Dec. 12, 1944 |
| 2,374,985 | Faver | May 1, 1945 |